United States Patent [19]

Oikawa et al.

[11] Patent Number: 4,908,409

[45] Date of Patent: Mar. 13, 1990

[54] POLYIMIDE

[75] Inventors: Hideaki Oikawa, Yokohama; Katsuaki Iiyama, Odawara; Nobuhito Koga, Yokohama; Saburo Kawashima, Yokosuka; Shoji Tamai; Masahiro Ohta, both of Yokohama; Akihiro Yamaguchi, Kamakura, all of Japan

[73] Assignee: Mitsui Toatsu Chemicals, Inc., Tokyo, Japan

[21] Appl. No.: 119,042

[22] Filed: Nov. 10, 1987

[30] Foreign Application Priority Data

Nov. 19, 1986 [JP] Japan .................................. 61-274206

[51] Int. Cl.$^4$ ............................................. C08G 69/26
[52] U.S. Cl. ...................................... 528/188; 528/125; 528/126; 528/172; 528/176; 528/187; 528/353
[58] Field of Search ............... 528/188, 176, 187, 125, 528/126, 172, 353

[56] References Cited

U.S. PATENT DOCUMENTS

| | | | |
|---|---|---|---|
| 4,421,907 | 12/1983 | Schmidt et al. | 528/188 |
| 4,443,591 | 4/1984 | Schmidt et al. | 528/188 |
| 4,526,838 | 7/1985 | Fujioka et al. | 528/172 |
| 4,696,994 | 9/1987 | Nakajima et al. | 528/125 |

FOREIGN PATENT DOCUMENTS 61-143478 7/1986 Japan .
62-68817 3/1987 Japan .

OTHER PUBLICATIONS

Modern Plastics International, Jun. 1982, pp. 38 to 39.
Kogyo Zairyo, 27, 98, (1979).

Primary Examiner—John Kight
Assistant Examiner—M. L. Moore
Attorney, Agent, or Firm—Fisher, Christen & Sabol

[57] ABSTRACT

Polyimide of this invention is almost colorless and has remarkably high light transmittance as well as excellent processability and adhesive properties at high temperatures in addition to its substantial high-temperature stability.

The polyimide is a novel polyimide capable of being used for space and aeronautical materials, electric and electronic members, automotive parts, and furthermore for high-temperature adhesives.

The polyimide has recurring units of the following formula

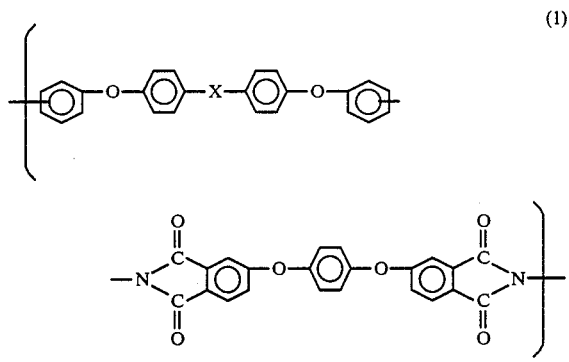

(1)

wherein X is a radical selected from the group consisting of a bond, divalent hydrocarbon radical having from 1 to 10 carbons, hexafluorinated isopropylidene radical, carbonyl radical, sulfonyl radical and thio radical, and each nitrogen atom of imide ring is located simultaneously at meta- or para-position to ether linkage.

The polyimide of this invention is prepared by reacting 4,4'-(p-phenylenedioxy)diphthalic dianhydride with an ether diamine having the following general formula (V):

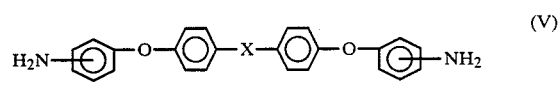

(V)

and successively imidizing the resultant polyamic acid.

Examples of the ether diamine used for preparing the polyamide include,
2,2-bis[4-(3-aminophenoxy)phenyl]propane, (Abstract continued on next page.)

2,2-bis[4-(4-aminophenoxy)phenyl]propane,
2,2-bis[4-(3-aminophenoxy)phenyl]-1,1,1,3,3,3-hexafluoropropane,
2,2-bis[4-(4-aminophenoxy)phenyl]-1,1,1,3,3,3-hexafluoropropane,
4,4'-bis(3-aminophenoxy)biphenyl,
4,4'-bis(4-aminophenoxy)biphenyl,
bis[4-(3-aminophenoxy)phenyl] ketone,
bis[4-(4-aminophenoxy)phenyl] ketone,
bis[4-(3-aminophenoxy)phenyl] sulfide,
bis[4-(4-aminophenoxy)phenyl] sulfide,
bis[4-(3-aminophenoxy)phenyl] sulfone and
bis[4-(4-aminophenoxy)phenyl] sulfone.

1 Claim, 2 Drawing Sheets

POLYIMIDE

BACKGROUND OF THE INVENTION

The present invention relates to a novel polyimide and more particularly to the polyimide which is almost colorless, capable of being extrusion or injection molded and is furthermore excellent as high-temperature adhesive.

Conventional polyimide obtained by the reaction of tetracarboxylic dianhydride with diamine has excellent electrical and mechanical properties in addition to its good high-temperature stability. Therefore the polyimide has been used in many fields such as electric and electronic members, space and aeronautic materials and automotive parts and is currently expected for the application to further various fields.

However, the polyimide which has so far been developed is generally low in light transmittance and mostly yellow or brown colored, although many of the polyimide exhibit excellent properties. For example, polyetherimide having the formula (II) "Modern Plastics International, June 1982, pages 38 to 39" has been known as polyimide having a high total light transmittance.

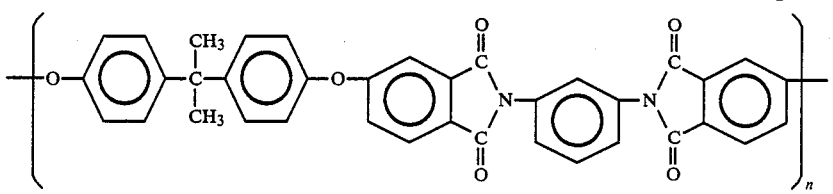

The film of the polyetherimide is almost colorless and is 35% in transmittance of light beam having a wave length of 400 nm at a thickness of 50 micrometers.

However, for use in the covering pad of solar cells in the recent space development program, polyimide is required to have a further high transmittance for total light, particularly a high transmittance in the wave length region of 400 nm which is the subject of space, and additionally have an excellent processability.

Besides the conventional polyimide has poor processability. On the other hand polyimide having good processability is inferior in the high-temperature stability and solvent resistance. Thus the performance of polyimide has both merits and drawbacks.

For example, the polyimide having recurring units of the formula (III):

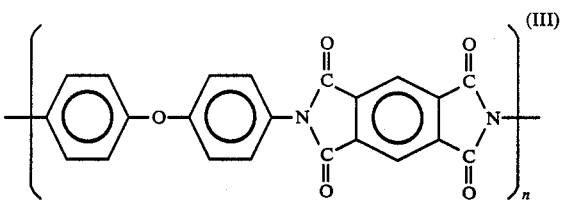

has been known to have high-temperature stability (for example, Kogyo Zairyo, 27, 98 (1979)). This polyimide, however, has no distinct glass transition temperature and is required to mold by special means such as sintering.

SUMMARY OF THE INVENTION

The object of this invention is to provide a polyimide which is high in the total light transmittance, possible to use also in the aerospace, easy to process in addition to its substantially excellent stability in high temperatures, and furthermore capable of being used as the high-temperature adhesives.

The present inventors have extensively investigated in order to achieve above-mentioned object and found a novel polyimide.

That is, the present invention is a polyimide having recurring units of the formula (I):

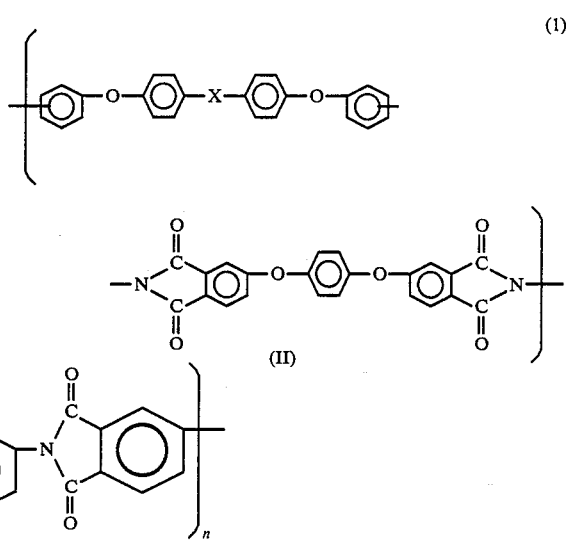

wherein X is a radical selected from the group consisting of a bond, divalent hydrocarbon radical having from 1 to 10 carbons, hexafluorinated isopropylidene radical, carbonyl radical, sulfonyl radical and thio radical and each nitrogen atom of imide ring is located simultaneously at meta- or para-position to ether linkage.

Polyimide of this invention can be used for a broad range of fields. The range of fields which can be considered includes, for example, molded articles such as precision instruments, electric and electronic members, sliding members etc., films such as adhesive films, flexible circuit substrate films, covering pad films etc., adhesive varnishes, wire covering varnishes, structural adhesives and matrix resin for composites.

DETAILED DESCRIPTION OF THE INVENTION

Figure 1:
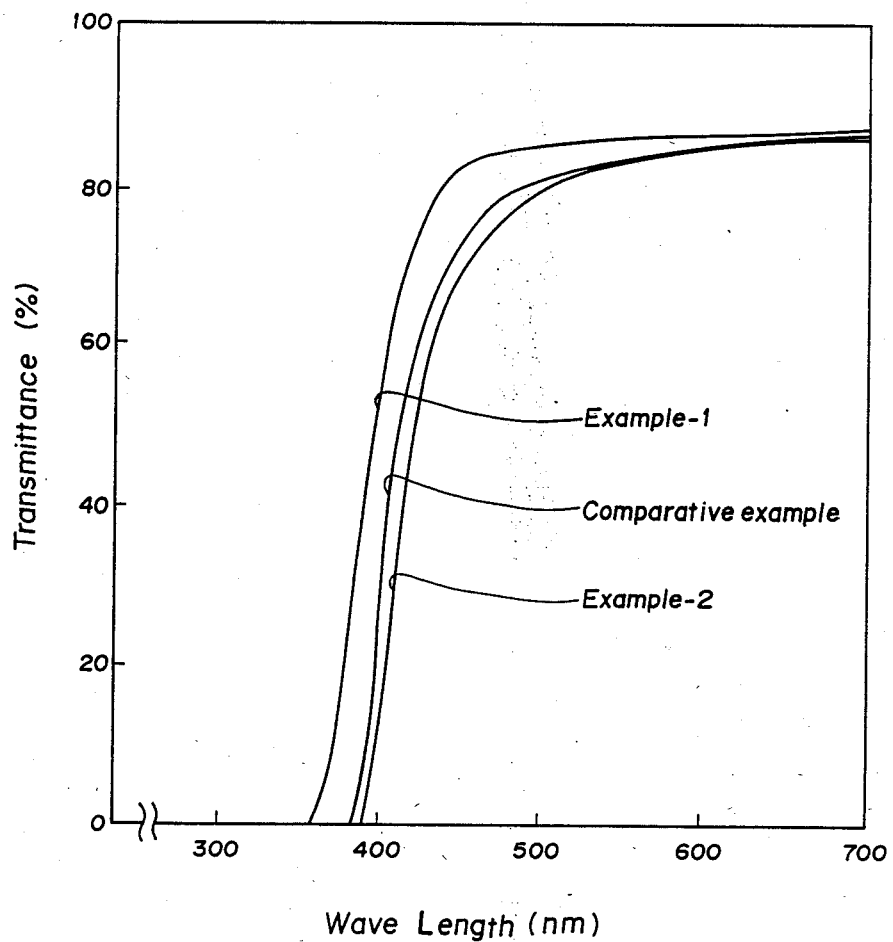
FIG. 1 shows examples of absorption spctra of polyimide in this invention in the visible and ultra violet regions.

The polyimide of this invention has recurring units of formula (I) and is prepared by reacting 4,4'-(p-phenylenedioxy)diphthalic dianhydride having the formula (IV):

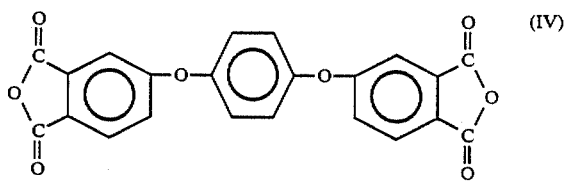

as a tetracarboxylic dianhydride, with an ether diamine having the formula (V):

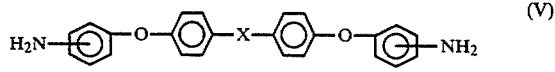

wherein X is the same as above, and each amino radical is located simultaneously at meta- or para-position to ether linkage, and carrying out dehydration and ring closure of resulting polyamic acid having recurring units of the formula (VI):

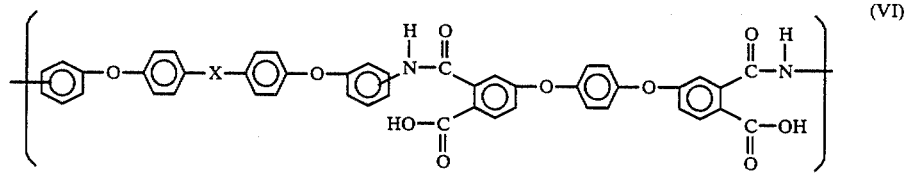

wherein X is the same as above, and each amide nitrogen is located simultaneously at meta- or para-position to ether linkage.

The etherdiamine which is used in this invention includes, for example,
bis[4-(3-aminophenoxy)phenyl]methane,
bis[4-(4-aminophenoxy)phenyl]methane,
1,1-bis[4-(3-aminophenoxy)phenyl]ethane,
1,1-bis[4-(4-aminophenoxy)phenyl]ethane,
1,2-bis[4-(3-aminophenoxy)phenyl]ethane,
1,2-bis[4-(4-aminophenoxy)phenyl]ethane,
2,2-bis[4-(3-aminophenoxy)phenyl]propane,
2,2-bis[4-(4-aminophenoxy)phenyl]propane,
2,2-bis[4-(3-aminophenoxy)phenyl]butane,
2,2-bis[4-(4-aminophenoxy)phenyl]butane,
2,2-bis[4-(3-aminophenoxy)phenyl]-1,1,1,3,3,3-hexafluoropropane,
2,2-bis[4-(4-aminophenoxy)phenyl]-1,1,1,3,3,3-hexafluoropropane,
4,4'-bis(3-aminophenoxy)biphenyl, 4,4'-bis(4-aminophenoxy)biphenyl,
bis[4-(3-aminophenoxy)phenyl] ketone,
bis[4-(4-aminophenoxy)phenyl] ketone,
bis[4-(3-aminophenoxy)phenyl] sulfide,
bis[4-(4-aminophenoxy)phenyl] sulfide,
bis[4-(3-aminophenoxy)phenyl] sulfone and
bis[4-(4-aminophenoxy)phenyl] sulfone.
The ether diamine is used singly or in combination of two or more.

In order to obtain polyimide of this invention, the ether diamine is reacted in an organic solvent with 4,4'-(p-phenylenedioxy)diphthalic dianhydride according to the usual method.

The organic solvent used in this reaction include, for example, N,N-dimethylformamide, N,N-dimethylacetamide, N,N-diethylacetamide, N,N-dimethylmethoxyacetamide, N-methyl-2-pyrrolidone, 1,3-dimethyl-2-imidazolidinone, N-methylcaprolactam, 1,2-dimethoxyethane, bis(2-methoxyethyl) ether, 1,2-bis(2-methoxyethoxy)ethane, bis[2-(2-methoxyethoxy)ethyl] ether, tetrahydrofuran, 1,3-dioxane, 1,4-dioxane, pyridine, picoline, dimethylsulfoxide, dimethylsulfone, tetramethylurea and hexamethylphosphoramide. The organic solvent is used alone or in combination of two or more.

The reaction temperature is normally 60° C. and less, and preferably 50° C. and less.

The reaction can be carried out under any pressure and ambient pressure is satisfactory.

The reaction time depends upon the sorts of either diamine and solvent used as well as reaction temperature. The reaction is usually continued for sufficient time to complete the formation of polyamic acid and the reaction time of 4–24 hours is normally enough.

The polyamic acid having recurring units of the aforesaid formula (VI) can be thus obtained.

In the next step, the resulting polyamic acid is thermally imidized by heating to 150°–400° C., chemically imidized by employing a common imidizing agent, or imidized by simultaneously using these thermal and chemical methods to obtain the polyimide of this invention having recurring units of the formula (I).

The polyimide of this invention is flowable at high temperatures while maintaining the same high-temperature stability as conventional polyimide. The polyimide of this invention is excellent in processing ability and has a slight reduction of adhesive strength at high temperatures.

In addition, the characteristics of film prepared from polyimide of this invention has a high total light transmittance and is almost colorless, and furthermore high in the transmittance of light beam having a wave length of 400 nm which is a subject of the aerospace.

The polyimide film of this invention can be prepared from the polyamic acid precursor or from polyimide itself.

The film forming method of polyimide which may be used in this invention includes general methods such as casting and melt extrusion.

For example, the organic solvent solution of polyamic acid is casted on a metal or glass plate with a doctor knife or coater etc. The coated plate is heated to carry out imidization. The film is obtained by stripping from the plate.

In alternative means, the organic solvent solution is added with an imidizing agent such as acetic anhydride and immediately casted on a glass plate. The coated plate is heated to evaporate the residual solvent and imidizing agent. The film thus obtained is stripped from the plate.

When the polyimide is soluble in the organic solvent, the solution can be casted and removed the solvent by heating to obtain the film.

Polyimide of this invention can be used as an adhesive by the following methods.

The aforesaid polyamic acid is dehydrated thermally or chemically to prepare, for example, film or powder of polyimide. The film or powder is inserted between substrates, pressed at a temperature of 50°–400° C. under pressure of 1–1,000 kg/cm² and cured at 100°–400° C. to obtain strongly adhered substrates.

In another method, a solution obtained by dissolving aforesaid polyamic acid in the organic solvent or the intact reaction mixture containing polyamic acid formed in the organic solvent is used to adhere the substrates. The substrates are coated with aforesaid polyamic acid solution and preheated in air at about 220° C. for the required time to remove excess solvent. The polyamic acid film thus formed on the substrate surface is successively converted to polyimide film. The polyimide film on the substrate surface is then overlapped and pressed at temperatures of 50°–400° C. under pressure of 1–1,000 kg/cm², followed by curing at 100°–400° C. The method is also suitable to obtain strong adhesion of the substrates.

EXAMPLES

The present invention will hereinafter be illustrated in detail with respect to the examples and comparative example.

Example 1

A reaction vessel fitted with a stirrer, reflux condenser and nitrogen inlet tube was charged with 14.737 g (0.04 mol) of 4,4'-bis(3-aminophenoxy)biphenyl and 121.3 g of N,N-dimethylacetamide. The mixture is added at room temperature under nitrogen atmosphere with 15.610 g (0.0388 mol) of 4,4'-(p-phenylenedioxy)diphthalic dianhydride by portions with care to avoid temperature rise of the solution. The reaction mixture was stirred for 24 hours at room temperature. The polyamic acid thus obtained had an inherent viscosity of 1.25 dl/g. (The inherent viscosity was measured at 35° C. in a solution containing 0.5 g of polyamic acid in 100 ml of N,N-dimethylacetamide.)

A part of above polyamic acid solution was casted on a glass plate and heated for an hour each at 100° C., 200° C. and 300° C. to obtain a colorless and transparent polyimide film having a thickness of 50 micrometers. The polyimide film had a tensile strength of 12.3 kg/mm² and an elongation of 10% according to ASTM D-882. The film also had a glass transition temperatue of 203° C. in accordance with TMA penetration method, 5% weight decrease temperature in air of 527° C. according to DTA-TG, total light transmittance of 90.7% and haze of 0.2% on the basis of ASTM D-1003, and transmittance of 62% for the light having a wave length of 400 nm.

FIG. 1 shows an absorption spectrum of the film in the visible and ultra-violet region.

Comparative Example

The polyetherimide having the above described formula (II) (Ultem TM; Trade mark of General Electric Co.) was measured its properties. Results of the total light transmittance and haze are illustrated in Table 1. Absorption spectrum in the visible and ultra violet regions is shown in FIG. 1. In the table and figure results of the polyimide film in Example 1 is illustrated in combination.

TABLE 1

| Sample | Film thickness | Light transmittance | Haze |
|---|---|---|---|
| Example 1 | 50 micrometers | 90.7% | 0.2% |
| Comparative | 50 micrometers | 86.8% | 2.2% |

TABLE 1-continued

| Sample | Film thickness | Light transmittance | Haze |
|---|---|---|---|
| Example | | | |

Example 2

The same procedures as in Example 1 was carried out except 14.737 g (0.04 mol) of 4,4'-bis(4-aminophenoxy)biphenyl was used in place of 14.737 g (0.04 mol) of 4,4'-bis(3-aminophenoxy)biphenyl. The polyamic acid thus obtained had an inherent viscosity of 1.80 dl/g.

A part of the polyamic acid solution was subjected to the same procedures as in Example 1 to obtain a light yellow polyimide film having a thickness of 50 micrometers. The film had a tensile strength of 13.0 kg/mm², elongation of 18%, glass transition temperature of 230° C. and 5% weight decrease temperature of 535° C. The polyimide film also had a total light transmittance of 85.5% and haze of 1.1%.

The absorption spectrum of the polyimide film in the visible and ultra violet regions is illustrated in FIG. 1 in combination with the result in Example 1.

Example 3

A reaction vessel fitted with a stirrer, reflux condenser and nitrogen inlet tube was charged with 15.857 g (0.04 mol) of bis[4-(3-aminophenoxy)phenyl] ketone and 125.8 g of N,N-dimethylacetamide. The mixture was added at the room temperature under nitrogen atmosphere with 15.610 g (0.0388 mol) of 4,4'-(p-phenylenedioxy)diphthalic dianhydride by portions with care to prevent temperature rise of the solution. After stirring for 24 hours at the room temperature, the resulting polyamic acid had an inherent viscosity of 0.82 dl/g.

A part of the above obtained polyamic acid solution was subjected to the same procedurres as in Example 1 to obtain a light yellow or colorless polyimide film having a thickness of 50 micrometers. The polyimide film had a tensile strength of 13.5 kg/mm², elongation of 10%, glass transition temperature of 191° C. and 5% weight decrease temperature of 524° C.

To 78.63 g of polyamic acid solution thus obtained, 78.6 g of N,N-dimethylacetamide was added, stirred for an hour under nitrogen atmosphere and added dropwise with 12.2 g (0.12 mol) of acetic anhydride and 8.08 g (0.08 mol) of triethylamine at the room temperature. After stirring for 24 hours at this temperature, the reaction mixture was poured into 500 g of water. The separated product was filtered, washed with methanol and dried at 180° C. for 24 hours under reduced pressure to obtain 14.70 g of yellow powder (98.0% yield).

Figure 2:
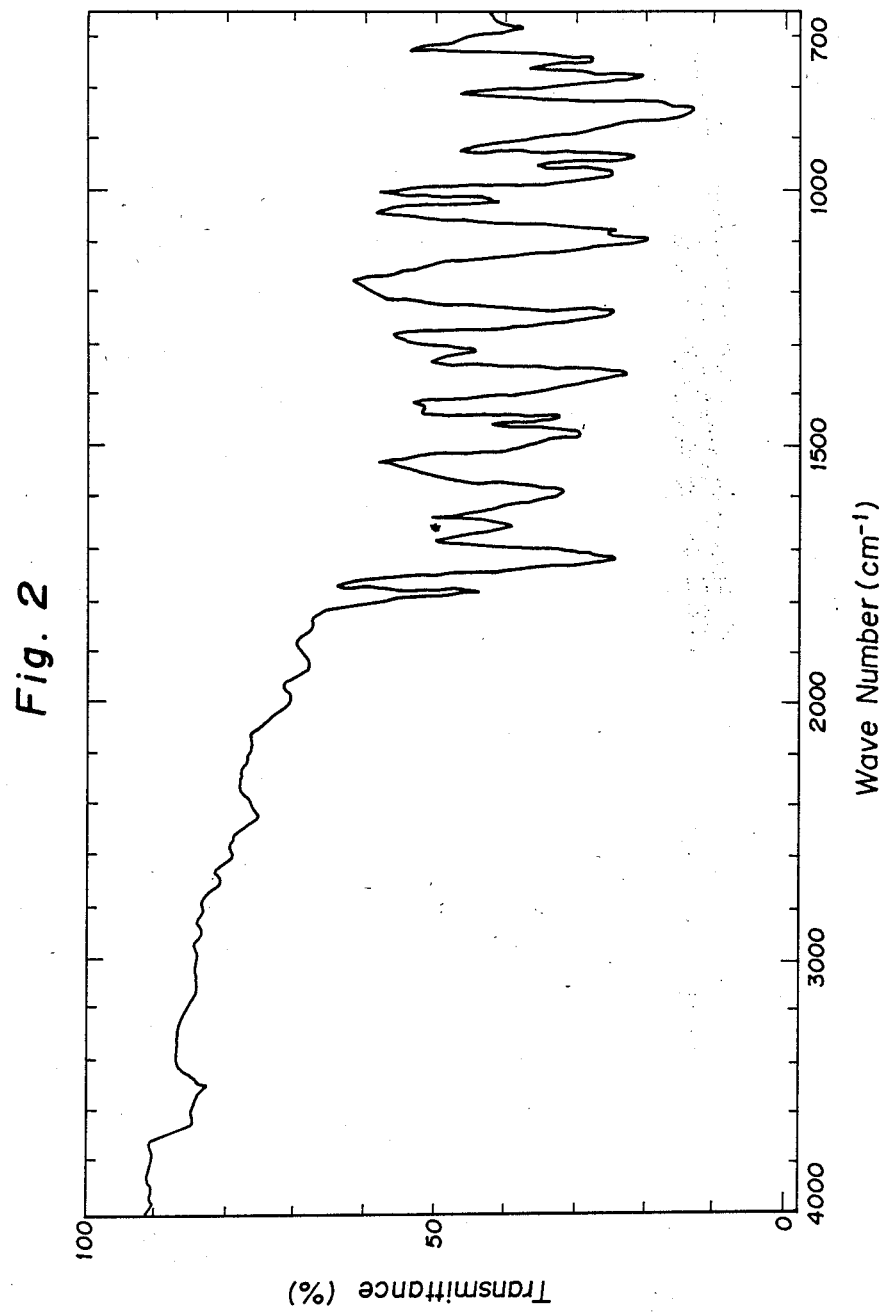
FIG. 2 shows an example of IR absorption spectrum of polyimide powder in this invention.

FIG. 2 illustrates IR absorption spectrum of resulting polyimide powder. The spectrum atlas remarkably shows the characteristic absorption of imide at 1780 cm$^{-1}$ and 1720 cm$^{-1}$, and that of ether linkage at 1240 cm$^{-1}$.

The polyimide powder thus obtained exhibited excellent high-temperature stability and had a glass transition temperature of 190° C. according to DSC method and 5% weight decrease temperature of 520° C.

The melt viscosity of the resulting polyimide powder was measured with a flow tester (CFT-500, a product from Shimadzu Manufacturing Co.). The nozzle employed had a diameter of 0.1 cm and a length of 1 cm. The load applied was 100 kg. The powder exhibited a good flow property of $1.5 \times 10^4$ poises at 320° C., $8.3 \times 10^3$ poises at 340° C., $3.5 \times 10^3$ poises at 360° C. and $1.1 \times 10^3$ poises at 380° C. The polyimide powder was thus found to be capable of injection molding.

In addition, the strands obtained at each extrusion temperature had no difference in color and were yellow, transparent and very flexible.

Example 4

The same procedures as in Example 3 was carried out except 15.857 g (0.04 mol) of [4-(4-aminophenoxy)phenyl] ketone is used in place of 15.857 g (0.04 mol) of ]4-(3-aminophenoxy)phenyl] ketone. The resulting polyamic acid had an inherent viscosity of 0.92 dl/g. A part of the polyamic acid solution thus obtained was subjected to the same procedures using a glass plate as in Example 1 to obtain a light yellow polyimide film having a thickness of 50 micrometers. The polyimide film had a tensile strength of 14.2 kg/mm², elongation of 13%, glass transition temperature of 215° C., 5% weight decrease temperature of 526° C. and melting point of 367° C. according to DSC method.

To 78.63 g of polyamic acid solution thus obtained, 78.6 g of N,N-dimethylacetamide was added as in Example 3. The mixture was chemically imidized by using 12.2 g (0.12 mol) of acetic anhydride and 8.08 g (0.08 mol) of triethylamine to obtain 14.6 g of yellow powder (97% yield). The resulting polyimide powder had a glass transition temperature of 213° C. according to DSC method, 5% weight decrease temperature of 523° C. and melting point of 359° C. in accordance with DSC method. The powder was a crystalline polyimide and had a crystallinity of 27% according to X-ray diffraction.

The melt viscosity of the resulting polyimide was measured by the same procedures as in Example 3 except measuring temperatures were varied. The sample exhibited no flow at 340° C. and 360° C. The melt viscosity was $1.6 \times 10^5$ poises at 380° C., $1.0 \times 10^4$ poises at 400° C., $5.3 \times 10^3$ poises at 420° and $4.7 \times 10^3$ poises at 440° C. These values exhibited the specific flow property of crystalline high polymers. In addition, the strands obtained at each extrusion temperature had no difference in color and were light yellow, transparent and very elastic.

Example 5

Polyamic acid solution was obtained by the same procedures as in Example 1 except 16.000 g (0.04 mol) of bis[4-(3-aminophenoxy)phenyl] sulfide were used in place of 14.737 g (0.04 mol) of 4,4'-bis(3-aminophenoxy)biphenyl and the amount of N,N-dimethylacetamide was changed from 121.3 g to 126.4 g. The resulting polyamic acid had an inherent viscosity of 1.46 dl/g.

A part of above obtained polyamic acid solution was subjected to the same procedures as in Example 1 to obtain a light yellow polyimide film having a thickness of 50 micrometers. The film had a tensile strength of 11.3 kg/mm², elongation of 9.2%, glass transition temperature of 192° C. and 5% weight decrease temperature of 529° C.

The polyamic acid solution thus obtained was applied on a cold rolled steel panel (JIS G-3141, spec/SD, $25 \times 100 \times 1.6$ mm) which had previously been washed with trichloroethylene and dried for an hour each at 100° C. and 220° C. The coated steel plate thus obtained was overlapped with another cold rolled steel panel and pressed at 350° C. for 5 minutes under pressure of 50 kg/cm²⁴. The thickness of coated adhesive was 35 micrometers.

The bonded specimen had a lap shear strength of 375 kg/cm² at the room temperature and 200 kg/cm² at 240° C. in accordance with JIS K-6848 and K-6850.

The resulting polyimide film was inserted between cold rolled steel panels which had been preheated to 150° C. and peressed at 350° C. for 5 minutes under pressure of 50 kg/cm². The bonded specimen had a lap shear strength of 363 kg/cm² at the room temperature and 210 kg/cm² at 240° C.

In addition the polyamic acid solution above obtained was casted on a electrolytic copper foil and heated for an hour each at 100° C., 200° C. and 300° C. to obtain a copper clad flexible circuit substrate. The resulting circuit substrate had a copper foil peel strength of 2.3 kg/cm² according to 90° peel strength test. After immersing the substrate in a soldar bath at 300° C. for 60 seconds, no blister or flaking was found at all.

Example 6

The same procedures as in Example 5 were carried out except bis[4-(4-aminophenoxy)phenyl] sulfide was used in place of bis[4-(3-aminophenoxy)phenyl] sulfide. The resulting polyamic acid solution was treated with the same procedures as in Example 5 to obtain a light yellow polyimide film having a thickness of 50 micrometers.

The polyamic acid thus obtained had an inherent viscosity of 1.22 dl/g, and the resulting polyimide film had a tensile strength of 11.0 kg/mm², elongation of 9.0%, glass transition temperature of 204° C., 5% weight decrease temperature of 525° C., melting point of 346° C. according to DSC and crystallinity of 31% in accordance with X-ray diffraction.

By using the polyamic acid solution thus obtained, adhesive strength between cold rolled steel panels was measured by the same procedures as in Example 5. The bonded specimen had a lap shear strength of 352 kg/cm² at the room temperature and 198 kg/cm² at 240° C.

The polyimide film thus obtained was inserted between cold rolled steel panels which had been preheated to 150° C. as in Example 5 and pressed at 370° C. for 5 minutes under pressure of 50 kg/cm². The bonded specimen had a lap shear strength of 350 kg/cm² at the room temperature and 205 kg/cm² at 240° C.

In addition a flexible copper clad circuit substrate was obtained by using an electrolytic copper foil as in Example 5. The circuit substrate had a copper foil peel strength of 2.0 kg/cm² according to 90° peel strength test. Afte immersing the substrate in a solder bath at 300° C. for 60 seconds, no change in the shape was found at all.

Example 7-11

The same procedures as in Example 1 was carried out except various ether diamines illustrated in Table 2 were used in place of 14.737 g (0.04 mol) of 4,4'-bis(3-aminophenoxy)biphenyl to obtain polyamic acid solution and polyimide film having a thickness of 50 micrometers as in Example 1.

The inherent viscosity of the resulting polyamic acid and the thermal and mechanical properties of polyimide film thus obtained were illustrated in Table 2.

TABLE 2

| Example | Tetracarboxylic dianhydride Compound | amount g (mol) | Ether diamine Compound | amount g (mol) | N,N—Dimethyl acetamide amount g | Polyamic acid inherent viscosity dl/g | Tensile strength Kg/mm² | Elongation % | Glass transition temperature °C. | 5% weight decrease temperature °C. |
|---|---|---|---|---|---|---|---|---|---|---|
| 7 | (1) | 15.610 (0.0388) | Bis[4-(3-aminophenoxy) phenyl] sulfone | 17.300 (0.040) | 131.64 | 1.37 | 15.2 | 14.0 | 208 | 547 |
| 8 | " | 15.610 (0.0388) | Bis[4-(4-aminophenoxy) phenyl] sulfone | 17.300 (0.040) | 131.64 | 1.43 | 11.3 | 11.3 | 239 | 536 |
| 9 | " | 15.610 (0.0388) | 2,2-Bis[4-(3-aminophenoxy) phenyl]propane | 16.420 (0.040) | 128.0 | 1.56 | 11.0 | 8.2 | 176 | 520 |
| 10 | " | 15.610 (0.0388) | 2,4-Bis[4-(4-aminophenoxy) phenyl]-2-methylpentane | 18.104 (0.040) | 134.9 | 1.47 | 7.5 | 6.5 | 265 | 490 |
| 11 | " | 15.610 (0.0388) | 2,2-Bis[4-(3-aminophenoxy) phenyl]-1,1,1,3,3,3-hexafluoropropane | 20.738 (0.040) | 145.4 | 1.42 | 10.2 | 14.3 | 284 | 541 |

Note;
(1) 4,4'-(p-phenylenedioxy) diphthalic dianhydride

What is claimed is:

1. Polyimide having a recurring unit of the formula:

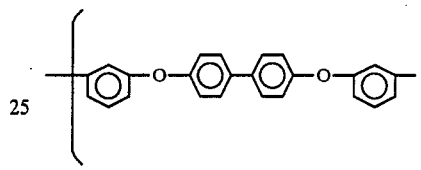

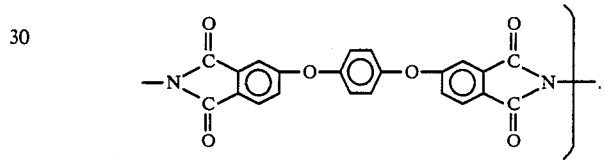

* * * * *